United States Patent
Braithwaite et al.

(10) Patent No.: US 8,195,790 B2
(45) Date of Patent: Jun. 5, 2012

(54) OPTIMIZATION OF A MESSAGE HANDLING SYSTEM

(75) Inventors: Kevin Anthony Braithwaite, Hedge End (GB); Tim Dunn, Warnford (GB); Jose Emir Garza, Richmond (GB)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 11/371,746

(22) Filed: Mar. 9, 2006

(65) Prior Publication Data

US 2006/0230177 A1    Oct. 12, 2006

(30) Foreign Application Priority Data

Mar. 24, 2005  (GB) .................................. 0506061.1

(51) Int. Cl.
*G06F 15/173* (2006.01)
(52) U.S. Cl. ......... 709/224; 709/223; 709/226; 709/222
(58) Field of Classification Search ........... 709/223–224
See application file for complete search history.

(56) References Cited

U.S. PATENT DOCUMENTS

| | | | | |
|---|---|---|---|---|
| 5,958,012 A * | 9/1999 | Battat et al. | ................... | 709/224 |
| 6,278,769 B1 * | 8/2001 | Bella | ......................... | 379/29.11 |
| 6,473,794 B1 * | 10/2002 | Guheen et al. | ................ | 709/223 |
| 6,606,585 B1 * | 8/2003 | Borowsky et al. | ................ | 703/2 |
| 6,694,288 B2 * | 2/2004 | Smocha et al. | ............... | 702/186 |
| 6,829,491 B1 * | 12/2004 | Yea et al. | ........................ | 455/560 |
| 7,035,930 B2 * | 4/2006 | Graupner et al. | ............. | 709/226 |
| 7,254,525 B2 * | 8/2007 | Briggs et al. | .................... | 703/23 |
| 2001/0051890 A1 | 12/2001 | Burgess | ............................ | 705/9 |
| 2003/0177160 A1 * | 9/2003 | Chiu et al. | .................... | 709/100 |
| 2004/0034555 A1 * | 2/2004 | Dismukes et al. | ................ | 705/7 |
| 2004/0093193 A1 * | 5/2004 | Osborn et al. | .................... | 703/2 |
| 2005/0086335 A1 * | 4/2005 | Liu et al. | ....................... | 709/223 |
| 2006/0015866 A1 * | 1/2006 | Ang et al. | ..................... | 717/174 |
| 2006/0064481 A1 * | 3/2006 | Baron et al. | ................... | 709/224 |

OTHER PUBLICATIONS

Karaesmen et al, "Control of arrivals in a finite bufferred queue with setup costs", 1997, Journal of the Operational Research Society, vol. 48, all pages.*
Vandalore et al, "Design and analysis of queue control functions for explicit rate switch schemes", 1998, IEEE, all pages.*

* cited by examiner

*Primary Examiner* — Hua Fan
(74) *Attorney, Agent, or Firm* — Jordan IP Law, PC

(57) ABSTRACT

A data processing method for optimizing one or more parameters of a message handling system comprises defining a test workload comprising a plurality of messages, simulating the normal operation of the message handling system, processing at least a portion of the test workload, changing one or more parameters of the message handling system, monitoring the performance of the message handling system, and generating an optimization of at least one parameter based upon the performance of the message handling system.

18 Claims, 3 Drawing Sheets

OPTIMIZATION OF A MESSAGE HANDLING SYSTEM

FIELD OF THE INVENTION

The invention relates to a data processing method for optimizing one or more parameters of a message handling system and to such a message handling system.

BACKGROUND

A message handling system is an arrangement of interconnected processing components, which may be configured as a single machine or as a series of machines such as servers connected together, with messages traveling between the components.

A message handling system would be used by, for example, a business to link together such things as a website, customer records, stock information, and financial details. These components are in communication with each other via messages (units of work) that are created according to the structure of the system. For example, when a customer places an order through the website of the business, this would generate one or more messages that can be held in queues maintained by a central facility. The components within the system can then access the queues to call messages to execute tasks in relation to the called message, such as accessing the customer's account to receive payment, reserving stock and so forth.

Software vendors provide solutions to businesses to enable them to set up such message handling systems, or to integrate existing (sub) systems into a single unitary whole. The central facility within the system, which can be maintained by a component of the system, controls the general operation of the system. A variety of system parameters are set and controlled by this central facility. This may include such things as the allocation of memory resources in the system, the maintaining and updating of a log (for use in recovery situations), the number of processes being run by the system, the persistence/non-persistence of messages, and so on.

The central facility will be accessible by an administrator of the system, via a suitable user interface. The administrator can, via the user interface, access data concerning the operation of the message handling system, such as the amount of message traffic, and can monitor the performance of the system and of the individual components. The administrator can also make changes to the system parameters to adjust or attempt to improve the performance of the message handling system.

It is common for a user of a message handling system to have an ongoing relationship with the original vendor of the product, for such matters as technical support. In particular, following installation or following a substantial change in the operating circumstances of the system (such as a change in customer base or the launch of new products), the original vendor or the system administrator may be called upon to optimize the message handling system, or at least attempt to improve the overall throughput of messages in the system.

To achieve this, it is necessary for a technically skilled person who is familiar with the particular system and with the operating arrangement of that system to understand and characterize the overall system and work out a projection of the likely optimum performance of the particular installation of the message handling system. This projection includes potential parameter changes within the system. These changes are usually then made, and an iterative process of improving the performance of the system is carried out.

It will be appreciated that this known method of improving the performance of a message handling system is expensive in terms of resources and expertise, and has the overall weakness that it relies very heavily on the skilled person's judgment and experience.

SUMMARY

According to a first aspect of the present invention, there is provided a data processing method for optimizing one or more parameters of a message handling system comprising: defining a test workload comprising a plurality of messages, simulating the normal operation of the message handling system, processing at least a portion of the test workload, changing one or more parameters of the message handling system, monitoring the performance of the message handling system, and generating an optimization of at least one parameter based upon the performance of the message handling system.

According to a second aspect of the present invention, there is provided a message handling system, comprising: a plurality of interconnected processing components for maintaining, communicating and processing messages, the plurality of interconnected processing components including a facility arranged to define a test workload comprising a plurality of messages, to simulate the normal operation of the message handling system, to process at least a portion of the test workload, to change one or more parameters of the message handling system, to monitor the performance of the message handling system, and to generate an optimization of at least one parameter based upon the performance of the message handling system.

According to a third aspect of the present invention, there is provided a computer program product on a computer readable medium, the computer program product comprising instructions, tangibly embedded in a computer readable medium, for optimizing one or more parameters of a message handling system comprising defining a test workload comprising a plurality of messages, simulating the normal operation of the message handling system, processing at least a portion of the test workload, changing one or more parameters of the message handling system, monitoring the performance of the message handling system, and generating an optimization of at least one parameter based upon the performance of the message handling system.

Owing to the invention, it is possible to provide a message handling system that can be optimized for one or more parameters in an automatic fashion. Little or no intervention is required by a user of the system, and the requirement for specialist adaptation of a message handling system is foregone. The system can perform its own optimization, and this planning will be performed on a real system with real data, not a forecast.

The aim of the optimization will usually be to maximize the throughput of messages through the system, which will be measured while the performance of the message handling system is monitored.

Advantageously, the data processing method further comprises receiving a signal to trigger the parameter optimization process. The signal to trigger the parameter optimization process can be generated automatically by the message handling system. The automatic generation of the trigger to optimize the message handling system, which may be based upon a factor such as time elapsed since system install or upgrade, results in a system that can self optimize without an administrator intervention. It is also possible that the system will recommend to a user that optimization should take place, based upon the system detecting that throughput requirements are not being met. This could be triggered by the system detecting that messages are waiting on an input queue for too long, for example.

Preferably, the step of defining a test workload is executed automatically by the message handling system by monitoring the normal operation of the message handling system. The automation of the creation of the test workload further reduces the intervention of a human operator in the optimization of the message handling system. Alternatively, the step of defining a test workload is executed by a user of the message handling system. The defining of the test workload can also be a combination of machine and human input, with the system proposing a test workload that a user can amend or extend as desired.

Ideally, the test workload includes a time period. The test workload represents a sample workload that the message handling system would process over a defined time period, perhaps fifteen minutes.

Advantageously, each of the plurality of messages in the test workload is designated by a type, and the steps of simulating the normal operation of the message handling system, and processing at least a portion of the test workload, are executed for each message type in turn.

To facilitate an effective optimization, the messages within the test workload are organized into types. There may be as few as two different types, or there could be ten or more types. There is no absolute definition of what these types have to be, it is sufficient that they cover the variety of different messages with which the system deals. Messages could be split into type according to their size, or the nature of the processing demands that they make, or the speed with which they need to be dealt, or a combination of these and other factors. By simulating the normal operation of the system for each type of message, in turn, information on those parameters effecting individual message types can be acquired.

In an alternative embodiment, the steps of simulating the normal operation of the message handling system, and processing at least a portion of the test workload, are executed for the entire test workload. In this embodiment, the designated test workload is processed by the message handling system, and information on the performance of the system as parameters are changed is relevant to the whole test workload, which is representative of the normal workload of the system.

Preferably, the steps of changing one or more parameters of the message handling system, and monitoring the performance of the message handling system, include using a genetic algorithm to modify the parameters of the message handling system. Since multiple parameters effect the operation of the message handling system, a defined algorithm or process is needed to achieve the optimization of those parameters that are chosen for inquiry (which may be just one or may be all of the possible parameters effecting system performance). One way of achieving the optimization is to use a genetic algorithm. The algorithm makes changes to the parameters on a (semi) random basis and monitors the resulting performance of the system. Those changes that result in improvement are kept and those that do not lead to improvement are discarded.

In an alternative embodiment, the steps of changing one or more parameters of the message handling system, and monitoring the performance of the message handling system, consists of changing a single parameter and monitoring the effects of the single change of parameter. This method, as an alternative to the use of a genetic algorithm, is most appropriate where only one, or a small number, of parameters are being optimized. In this case, a single parameter is changed incrementally until it finds the point of best performance, and then this is repeated for each of the other parameters in turn. This can be done recursively, if it is considered likely that later changes to other parameters may affect the "best" value for parameters already optimized.

BRIEF DESCRIPTION OF THE DRAWINGS

Embodiments of the present invention will now be described, by way of example only, with reference to the accompanying drawings, in which.

DETAILED DESCRIPTION

Figure 1:
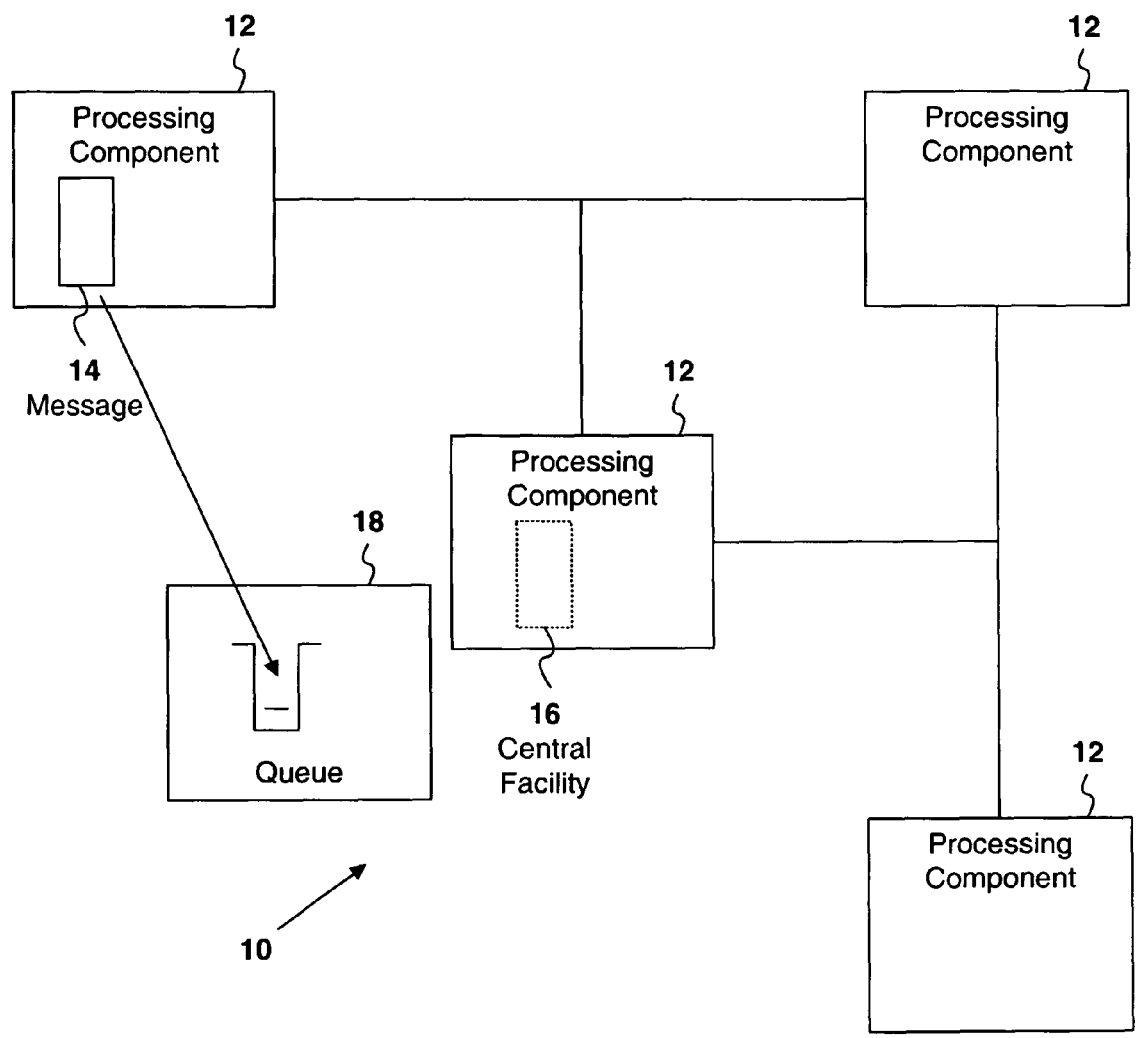
FIG. 1 is a schematic diagram of a message handling system.

FIG. 1 shows a message handling system 10, which comprises a plurality of interconnected processing components 12. These components 12, in many practical applications are only separate in a logical sense, being different parts of a single computing system. The components 12 are for maintaining, communicating and processing messages, an example of such a message being the message 14. At least one of the components, and possibly all of them, has the capability to create messages 14. Messages can be created at a very fast rate, in the order of hundreds per second.

The plurality of interconnected processing components 12 include a central facility 16, which has the role of coordinating many of the organizational aspects of the message handling system 10. In particular, the facility 16 will maintain one or more queues 18 of messages 14. When a component 12 creates a message 14, this will be placed on a queue 16 within the facility 18. The facility 16 is responsible for the management of the queue 18, including such factors as the logging of messages 14 for data recovery purposes, and the locking of queues when messages 14 are called by other components within the system.

The facility 16 is also accessible by an administrator of the system 10, via a suitable user interface, to access information about the performance of the system 10 and to set or adjust any system parameters. These parameters will relate to all aspects of the system 10 including such things as the allocation of memory resources in the system 10, the maintaining and updating of the message log, the number of processes being run by the system 10, and the persistence/non-persistence of messages. In most systems many other user adjustable parameters will be present.

When a message handling system such as that shown in FIG. 1 is installed, then decisions are made concerning the setting of parameters for the running of the system. These are likely to be set at a default level, with possibly some adjustment by the expert installer of the system. However, once this has been done, the system 10 will run with the message traffic that is generated by the real working of the system 10.

The system 10 includes the functionality of automatic optimization. This autonomic process of optimization (of one or more parameters) is triggered, either automatically within the system 10 or can be triggered by an action of a user through the user interface of the facility 16.

Once the system has been triggered to perform the optimization, it will enter a test mode and the normal functioning of the message handling system 10 will be stopped. In its simplest form the optimization will have as its aim the calculation of the maximum throughput of messages by the system 10, and all parameters will be optimized to achieve this end.

Figure 2:
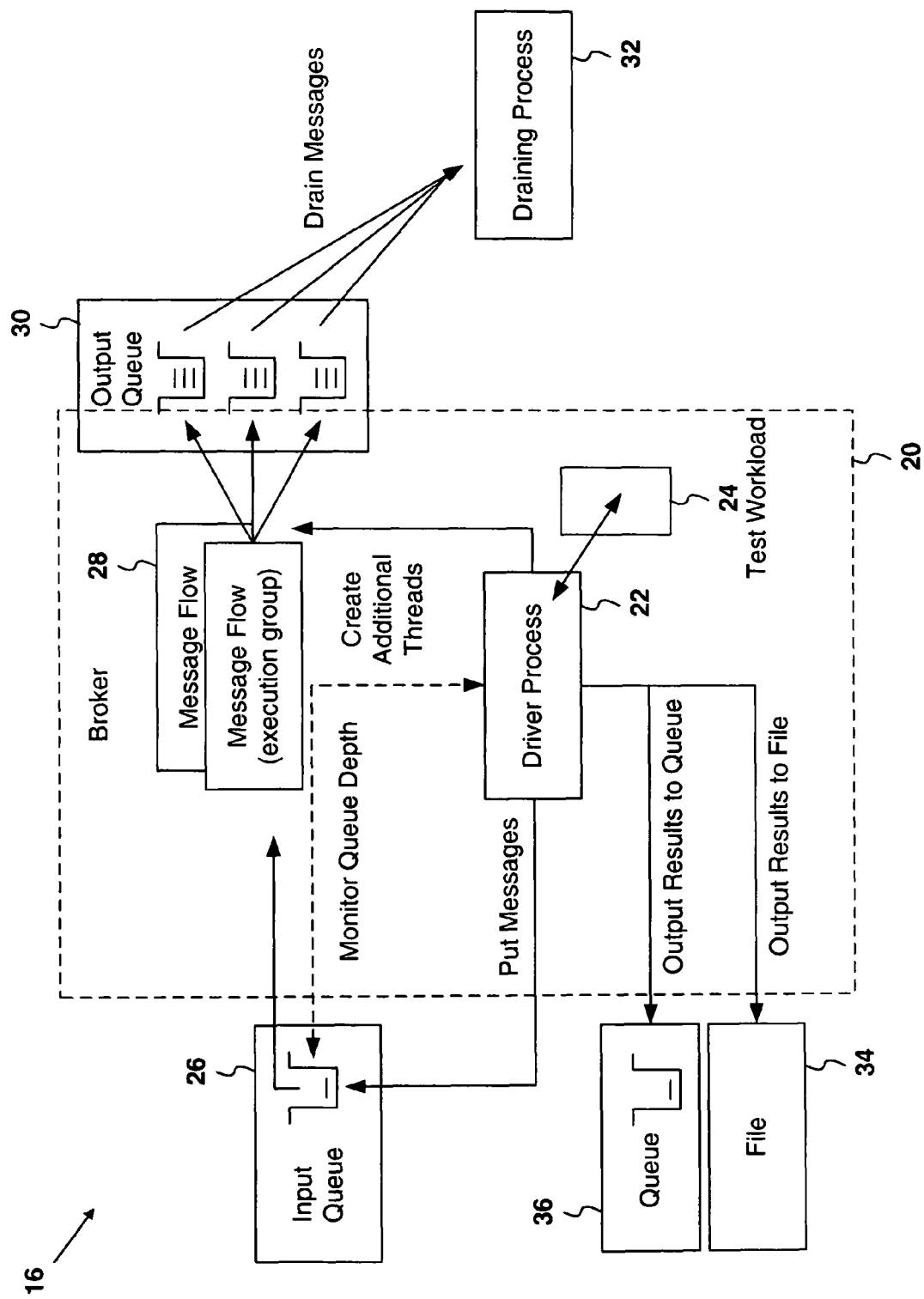
FIG. 2 is a schematic diagram of a component of the message handling system of FIG. 1.

In order to execute the optimization, the facility 16 is arranged to define a test workload (shown in FIG. 2). The test workload 24 comprises a plurality of messages, and is either created by the facility 16 automatically by monitoring the normal running of the system 10, or is user defined, or a combination of these methods is possible. The test workload 24 can be stored locally and can be updated over time, until it is needed for an optimization of the system 10.

FIG. 2 illustrates in more detail some of the workings of the central facility 16, in which a broker 20, one example of a message processing system, is controlling units within the facility 16. These units include a driver process 22, which simulates the normal operation of the message handling system 10 by emulating the work of the components. The driver process 22 has access to the test workload 24, which contains a plurality of messages. These messages in the test workload 24 are designed to represent a segment of the normal working of the message handling system 10. Each of the plurality of messages in the test workload 24 can be designated by a type. For example, if 90% of the messages handled by the system 10 are of a first type and 10% are of a second type, then the test workload would contain 9 messages of the first type and 1 of the second type to model the normal workflow through the system 10.

Figure 3:
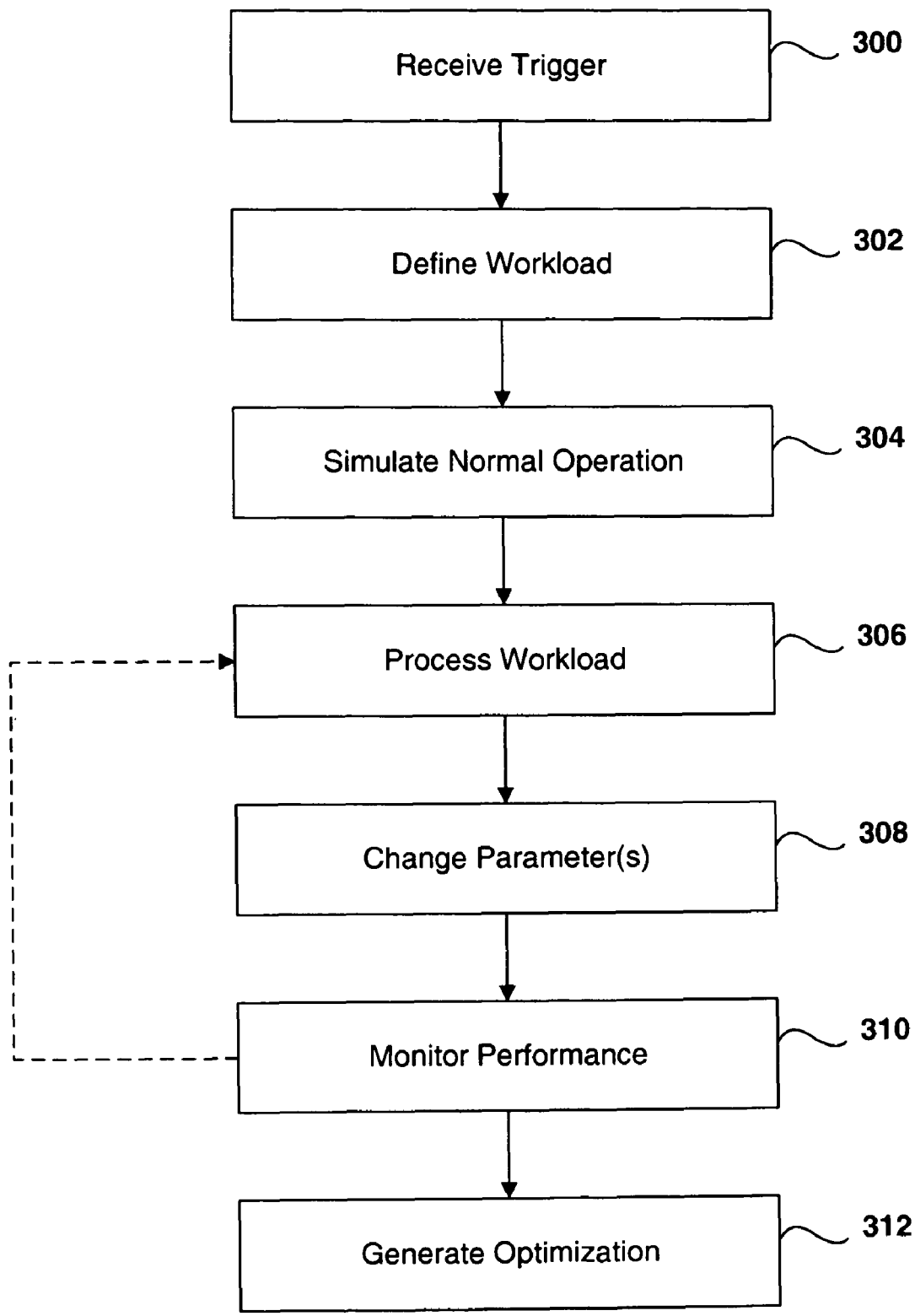
FIG. 3 is a flowchart of a data processing method for optimizing one or more parameters of the message handling system of FIGS. 1 and 2.

The optimization process is summarized in FIG. 3, with the first three steps being as discussed above, of receiving 300 an instruction to begin the optimization process, secondly defining 302 the test workload 24 and thirdly simulating 304 the normal operation of the system 10, which is carried out by the driver process 22.

The next stage in the method is the step 306 of processing at least a portion of the test workload 24. The driver process can either use all of the messages in the test workload 24 to drive the optimization or can take each of the different types of message in turn to calculate the optimization. Once the processing of the workload 24 has begun, then the driver process can change the parameters in the system (step 308) and monitor 310 the performance of the system, ultimately generating 312 an optimization of the system 10.

The steps 308 and 310 of changing one or more parameters of the message handling system 10, and monitoring the performance of the message handling system 10, can include the use of a genetic algorithm to modify the parameters of the message handling system 10. This will lead to a recursive repetition of the steps 306, 308 and 310 as shown by the dotted arrow in FIG. 3. The genetic algorithm will modify the parameters in random fashion and test the results with a learning process to identify those changes that improve the performance of the system 10.

An alternative to the use of a genetic algorithm is for the steps 308 and 310 of changing one or more parameters of the message handling system, and monitoring the performance of the message handling system, to consist of changing a single parameter and monitoring the effects of the single change of parameter. This again will be in many instances a recursive process. FIG. 2 relates to an example of a single parameter change to optimize the system 10.

In FIG. 2, the driver process 22 uses the messages in the test workload 24 to start off a recursive process of optimization. The messages within the workload 24 are sent to an input queue 26, at a specific time rate of, for example, 1 per second, which will feed the messages through execution groups 28.

The single parameter that is being optimized is the number of processes (shown as execution groups in the Figure) being run by the broker 20.

The processes 28 will process the messages that they receive an place the output messages onto output queues 30. The depth of the input queue 26 is monitored by the driver process 22 and if there is a potential for more messages to be placed onto queue 26 then the rate of placing of messages on the queue 26 is increased. An additional draining process 32 is created to drain the messages from the output queues 30. The depth of the queue 26 is continually monitored and the rate is increased to the point at which there is no more scope for additional throughput. An example of the processing of the driver is as follows:

```
Rate = 1 message per second, Average = 0, MaxRate = 0
While Rate > MaxRate
    Do 32 times [32 could be replaced to be other value if proved
more effective in production]
        Put Message to Input Q at rate specified (in this case
        1 every second)
        Wait for 1/Rate seconds
        Monitor the depth of the Q -> Curdepth
        Calculate average depth of Q: (Average * 31 + Curdepth)/32
    End
    If Average > 1
        If Rate > MaxRate
            MaxRate = Rate
            Create a new instance of the flow
        Else
            Report max rate and number of instances
        EndIf
    Else
        Increase Rate = Rate + 10% [10% be replaced to be other
        value if proved more effective in production]
    EndIf
Endwhile
```

At the point at which the Q Depth is greater than 1 (averaged) a check is made to see if the rate has increased from any previous recorded. If so then the driver process will create a new thread as more throughput could be possible. If not then the facility will report the findings and exit. If the Q Depth is less than one then the rate at which messages are put on the input Q is increased. On completion the maximum message rate possible for the machine tested is placed in a file 34 or onto a Q (36) along with the necessary message processing application, in this example, broker configuration.

In this way a single parameter can be optimized automatically for a message handling system, to increase the performance of the system. Multiple parameters can be optimized in turn, or can be optimized in parallel.

We claim:

1. A data processing method for optimizing one or more parameters of a message handling system, said method comprising:
   defining a test workload comprising a plurality of messages, wherein the test workload is defined exclusively by the message handling system by monitoring normal operation of the message handling system;
   simulating the normal operation of the message handling system;
   processing at least a portion of the test workload;
   changing one or more parameters of the message handling system;
   monitoring performance of the message handling system with respect to the processing of at least a portion of the test workload;

generating an optimization of at least one parameter based upon the performance of the message handling system with respect to the processing of at least a portion of the test workload, wherein the simulating is performed by a processing component of the message handling system, and wherein the normal operation of the message handling system is stopped upon the message handling system entering a test mode that includes processing of the at least a portion of the test workload;

sending the plurality of messages of the test workload to an input queue;

monitoring a depth of the input queue, wherein a rate of placing messages on the input queue is increased if there is potential for more messages to be placed on the input queue; and creating a draining process to drain the plurality of messages from an output queue, wherein changing one or more parameters of the message handling system and monitoring the performance of the message handling system include using a genetic algorithm to modify the one or more parameters of the message handling system in random fashion and test a result with a learning process.

2. The method according to claim 1, further comprising receiving a signal to trigger generating the optimization.

3. The method according to claim 2, wherein the signal is generated automatically by the message handling system.

4. The method according to claim 1, wherein the test workload includes a defined time period over which the at least a portion of the test workload is processed.

5. The method according to claim 1, wherein each of the plurality of messages in the test workload is designated by a type.

6. The method according to claim 5, wherein simulating the normal operation of the message handling system and processing at least a portion of the test workload are executed for each message type in turn.

7. The method according to claim 1, wherein simulating the normal operation of the message handling system and processing at least a portion of the test workload are executed for the entire test workload.

8. The method according to claim 1, wherein changing one or more parameters of the message handling system and monitoring the performance of the message handling system comprise changing only a single parameter and monitoring effects of the change of the single parameter.

9. The method of claim 1, wherein the test workload is representative of a normal workload of the message handling system and the performance corresponds to the processing of the at least a portion of the test workload.

10. A message handling system, comprising a non-transitory computer readable storage medium and a plurality of interconnected processing components for maintaining, communicating and processing messages, the plurality of interconnected processing components including a facility exclusively defining a test workload comprising a plurality of messages, wherein the test workload is defined exclusively by the message handling system by monitoring normal operation of the message handling system, storing the test workload for subsequent update to the test workload, simulating the normal operation of the message handling system, processing at least a portion of the test workload, changing at least one parameter of the message handling system, monitoring performance of the message handling system with respect to the processing of at least a portion of the test workload, generating an optimization of at least one parameter based upon the performance of the message handling system with respect to the processing of at least a portion of the test workload, wherein the simulating is performed by a processing component of the message handling system, and wherein the normal operation of the message handling system is stopped upon the message handling system entering a test mode that includes processing of the at least a portion of the test workload;

sending the plurality of messages of the test workload to an input queue;

monitoring a depth of the input queue, wherein a rate of placing messages on the input queue is increased if there is potential for more messages to be placed on the input queue; and creating a draining process to drain the plurality of messages from an output queue, wherein changing at least one parameter of the message handling system and monitoring the performance of the message handling system include using a genetic algorithm to modify the at least one parameter of the message handling system in random fashion and test a result with a learning process.

11. The system according to claim 10, wherein the facility is arranged to define the test workload in response to receipt of a signal.

12. The system according to claim 11, wherein the signal is generated automatically by the message handling system.

13. The system according to claim 10, wherein the test workload includes a defined time period over which the at least a portion of the test workload is processed.

14. The system according to claim 10, wherein each of the plurality of messages in the test workload is designated by a type.

15. The system according to claim 14, wherein the facility, when simulating the normal operation of the message handling system, and processing at least a portion of the test workload, is arranged to repeat these operations for each message type in turn.

16. A computer program product on a non-transitory computer readable storage medium comprising instructions for optimizing one or more parameters of a message handling system, said instructions comprising defining a test workload comprising a plurality of messages, wherein the test workload is defined exclusively by the message handling system based on monitoring normal operation of the message handling system, storing the test workload, simulating the normal operation of the message handling system, processing at least a portion of the test workload, changing one or more parameters of the message handling system, monitoring performance of the message handling system with respect to the processing of at least a portion of the test workload, generating an optimization of at least one parameter based upon the performance of the message handling system with respect to the processing of at least a portion of the test workload, wherein the simulating is performed by a processing component of the message handling system, and wherein the normal operation of the message handling system is stopped upon the message handling system entering a test mode that includes processing of the at least a portion of the test workload;

sending the plurality of messages of the test workload to an input queue;

monitoring a depth of the input queue, wherein a rate of placing messages on the input queue is increased if there is potential for more messages to be placed on the input queue; and creating a draining process to drain the plurality of messages from an output queue, wherein changing one or more parameters of the message handling system and monitoring the performance of the message handling system include using a genetic algorithm to modify the one or more parameters of the message handling system in random fashion and test a result with a learning process.

17. The computer program product of claim 16, wherein each of the plurality of messages in the test workload is designated by a type, and wherein the simulating the normal operation of the message handling system and the processing at least a portion of the test workload are performed for each message type in turn.

18. The computer program product of claim 16, wherein the changing one or more parameters of the message handling system and the monitoring the performance of the message handling system are performed recursively.

* * * * *